US012342923B2

(12) United States Patent
Kosecoff

(10) Patent No.: US 12,342,923 B2
(45) Date of Patent: Jul. 1, 2025

(54) AUGMENTED REALITY COSMETIC DESIGN FILTERS

(71) Applicant: L'Oreal, Paris (FR)

(72) Inventor: David Kosecoff, San Francisco, CA (US)

(73) Assignee: L'Oreal, Paris (FR)

( * ) Notice: Subject to any disclaimer, the term of this patent is extended or adjusted under 35 U.S.C. 154(b) by 693 days.

(21) Appl. No.: 17/491,061

(22) Filed: Sep. 30, 2021

(65) Prior Publication Data

US 2023/0101374 A1    Mar. 30, 2023

(51) Int. Cl.
*A45D 44/00* (2006.01)
*G06T 7/20* (2017.01)
(Continued)

(52) U.S. Cl.
CPC .............. *A45D 44/005* (2013.01); *G06T 7/20* (2013.01); *G06T 7/70* (2017.01); *G06T 7/90* (2017.01);
(Continued)

(58) Field of Classification Search
CPC .... G06T 7/20; G06T 7/70; G06T 7/90; G06T 2207/30201; G06T 2219/2021; G06V 20/20
See application file for complete search history.

(56) References Cited

U.S. PATENT DOCUMENTS 11,178,956 B1 * 11/2021 Prout .................... A45D 44/005
2009/0151741 A1 * 6/2009 Ngo ..................... A45D 44/005
132/319

(Continued)

FOREIGN PATENT DOCUMENTS

EP         3709637 A1 *  9/2020  .......... A45D 44/005
JP      2021-144582 A     9/2021

OTHER PUBLICATIONS

Treepong, B, et al., "The Development of an Augmented Virtuality for Interactive Face Makeup System," Proceedings of the SAT 2015: 18th International Conference on Theory and Applications of Satisfiability Testing, Austin, TX, Sep. 24-27, 2015, pp. 614-625.
Mohr, P, et al., "Retargeting Video Tutorials Showing Tools With Surface Contact to Augmented Reality," CHI '17: Proceedings of the 2017 CHI Conference on Human Factors in Computing Systems, Denver, CO, May 6-11, 2017, pp. 6547-6558.

(Continued)

*Primary Examiner* — Dmitry Suhol
*Assistant Examiner* — Alyssa A Brandley
(74) *Attorney, Agent, or Firm* — Christensen O'Connor Johnson Kindness PLLC

(57) ABSTRACT

Systems, devices, and methods for generating, sharing, and presenting augmented reality cosmetic design filters. One or more non-transitory computer memory devices can store computer-readable instructions that, when executed by computing circuitry, cause the computing circuitry to perform operations for generating augmented reality cosmetic design filters. The operations can include defining a baseline description of a biological surface using one or more radiation sensors, the radiation sensors being electronically coupled with the computing circuitry. The operations can include identifying an application of a cosmetic formulation to the biological surface using one or more of the radiation sensors. The operations can include generating a trace describing the application in reference to the baseline description. The operations can also include outputting the trace.

15 Claims, 8 Drawing Sheets

(51) Int. Cl.
*G06T 7/70* (2017.01)
*G06T 7/90* (2017.01)
*G06T 19/00* (2011.01)
*G06T 19/20* (2011.01)
*G06V 20/20* (2022.01)

(52) U.S. Cl.
CPC ............ *G06T 19/006* (2013.01); *G06T 19/20* (2013.01); *G06V 20/20* (2022.01); *A45D 2044/007* (2013.01); *G06T 2207/30201* (2013.01); *G06T 2219/2021* (2013.01)

(56) References Cited

U.S. PATENT DOCUMENTS

| | | | |
|---|---|---|---|
| 2010/0189357 A1 | 7/2010 | Robin et al. | |
| 2012/0223956 A1* | 9/2012 | Saito | G06F 3/0481 382/284 |
| 2014/0210814 A1* | 7/2014 | Kim | G06T 19/00 345/629 |
| 2015/0262403 A1* | 9/2015 | Yamanashi | G06T 7/73 345/634 |
| 2017/0095070 A1* | 4/2017 | Machiorlette | A46B 15/001 |
| 2017/0255478 A1* | 9/2017 | Chou | G06F 3/012 |
| 2019/0059561 A1* | 2/2019 | Shen | G06V 40/193 |
| 2019/0166980 A1* | 6/2019 | Huang | G06Q 30/02 |
| 2019/0213908 A1* | 7/2019 | Besen | G09B 5/02 |
| 2019/0244408 A1* | 8/2019 | Nishi | G06T 3/20 |
| 2019/0362521 A1* | 11/2019 | Kuo | G06T 7/11 |
| 2021/0304517 A1* | 9/2021 | Barron | G06T 7/20 |

OTHER PUBLICATIONS

Soares Borges, A.F., and C.H. Morimoto, "A Virtual Makeup Augmented Reality System," 2019 21st Symposium on Virtual and Augmented Reality (SVR) IEEE, Oct. 28-31, 2019, Rio de Janeiro, Brazil, pp. 34-41.

International Search Report and Written Opinion mailed Jan. 25, 2023, issued in corresponding International Application No. PCT/US2022/077230, filed Sep. 29, 2022, 22 pages.

Japanese Office Action mailed Feb. 27, 2025, issued in related Japanese Application No. 2022-519514, filed Mar. 10, 2024, 10 pages.

Aline De Fatima Soares Borges et al., "A Virtual Makeup Augmented Reality System", Institute of Mathematics and Statistics (IME), University of Sao Paulo, 2019, pp. 34-42, DOI 10.1109/SVR.2019.00022, Dowoladed Jan. 31, 2024 from IEEE Xplore.

Peter Mohr et al., "Retargeting Video Tutorials Showing Tools With Surface Contact to Augmented Reality", CHI 2017, May 6-11, 2017, ACM 978-1-4503-4655-9/17/05, DOI: http://dx.doi.org/10.1145/3025453.3025688, Denver, CO.

* cited by examiner

AUGMENTED REALITY COSMETIC DESIGN FILTERS

SUMMARY

Systems, devices, and methods for generating, sharing, and presenting augmented reality cosmetic design filters. One or more non-transitory computer memory devices can store computer-readable instructions that, when executed by computing circuitry, cause the computing circuitry to perform operations for generating augmented reality cosmetic design filters. The operations can include defining a baseline description of a biological surface using one or more radiation sensors, the radiation sensors being electronically coupled with the computing circuitry. The operations can include identifying an application of a cosmetic formulation to the biological surface using one or more of the radiation sensors. The operations can include generating a trace describing the application in reference to the baseline description. The operations can also include outputting the trace.

In some embodiments, identifying the application of the cosmetic formulation includes detecting the cosmetic formulation relative to the biological surface using one or more of the radiation sensors and the baseline description. Generating the trace can include receiving information describing a plurality of shape types, attributing a first shape type of the shape types to at least a portion of the biological surface using the baseline description, generating a numerical representation of the application of the cosmetic formulation, the numerical representation describing position information relative to the baseline description, and transforming the numerical representation from the first shape type to a second shape type of the shape types. The biological surface can be a face. The first shape type and the second shape type can describe a facial feature. Defining the baseline description of the biological surface can include projecting invisible electromagnetic radiation onto the biological surface using a radiation source electronically coupled with the computing circuitry. The one or more radiation sensors can include a camera configured to detect electromagnetic radiation from ultraviolet, visible, or infrared spectral ranges, or a combination thereof.

In some embodiments, generating the trace includes tracking a motion of the application relative to the biological surface and generating a numerical representation of the motion relative to the baseline description. The operations can further include identifying the cosmetic formulation and defining a color of the cosmetic formulation using identifier information of the cosmetic formulation. The operations can further include estimating a surface tone of the biological surface, estimating a formulation tone of the cosmetic formulation using, and determining a color of the cosmetic formulation using the surface tone and the formulation tone.

In some embodiments, the one or more non-transitory computer memory devices are electronically coupled with a smart phone. Outputting the trace can include communicating the trace to a remote computing system.

A method for generating an augmented reality cosmetic design filter can include defining a baseline description of the biological surface using one or more radiation sources and one or more radiation sensors. The method can include identifying an application of a cosmetic formulation to the biological surface using the radiation sensors. The method can include generating a trace describing the application in reference to the baseline description. The method can also include outputting the trace.

In some embodiments, generating the trace includes receiving shape information describing a plurality of shape types, attributing a first shape type of the shape types to at least a portion of the biological surface using the shape information, generating a numerical representation of the application of the cosmetic formulation, the numerical representation describing position information relative to the baseline description, transforming the numerical representation from the first shape type to a second shape type of the shape types. In some embodiments, identifying the application of the cosmetic formulation includes detecting an applicator of the cosmetic formulation, estimating a position of the applicator of the cosmetic formulation relative to the biological surface, tracking a motion of the applicator relative to the biological surface, and generating a numerical representation of the motion relative to the baseline description. The method can further include estimating a surface tone of the biological surface, estimating a formulation tone of the cosmetic formulation, and determining a color of the cosmetic formulation using the surface tone and the formulation tone.

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

Figure 1:
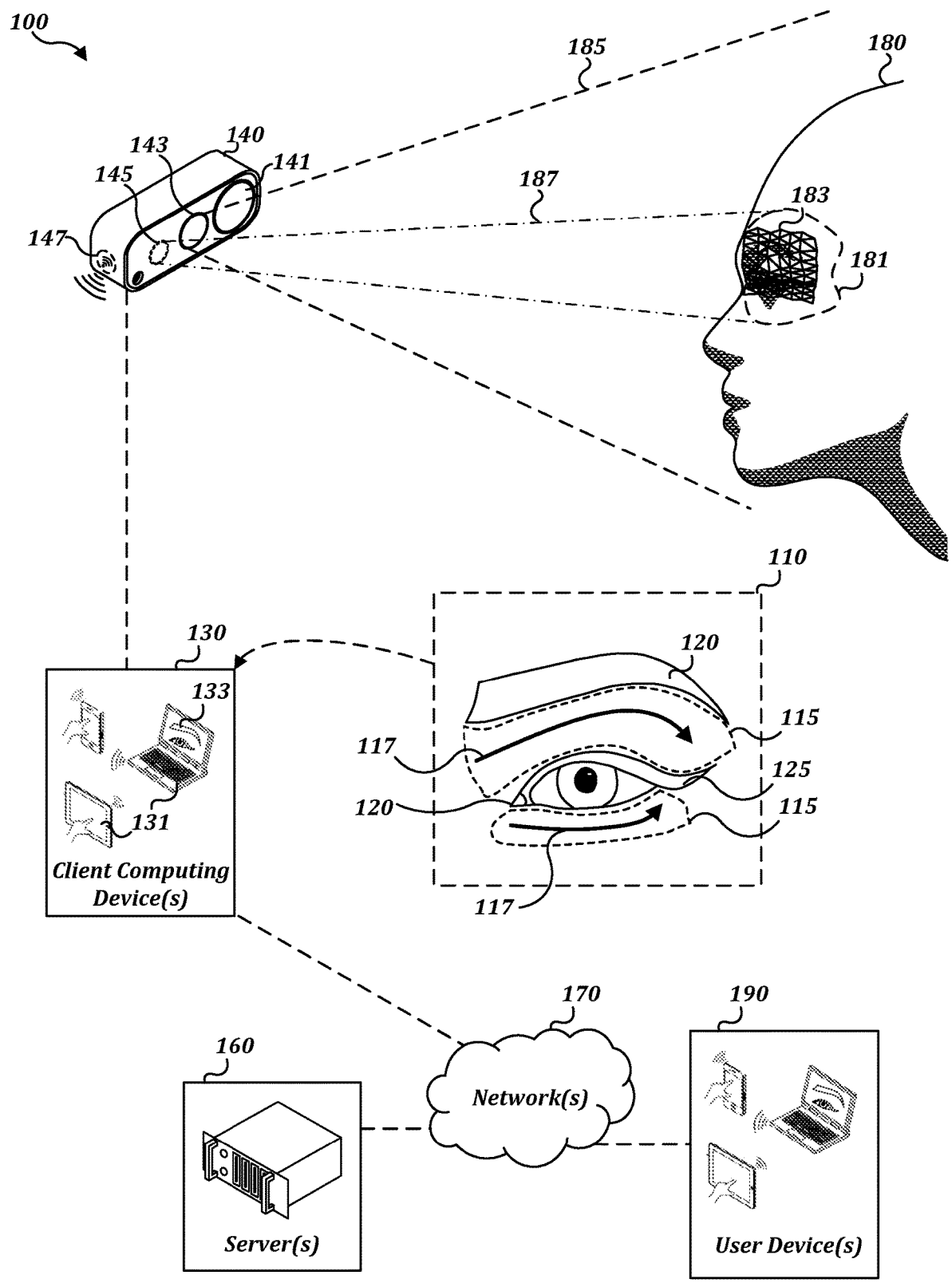
FIG. 1 is a schematic diagram illustrating an embodiment of a system for extrapolating a cosmetic design, in accordance with various embodiments.

In the above-referenced drawings, like reference numerals refer to like parts throughout the various views unless otherwise specified. Not all instances of an element are necessarily labeled to simplify the drawings where appropriate. The drawings are not necessarily to scale, emphasis instead being placed upon illustrating the principles being described. The foregoing aspects and many of the attendant advantages of this invention will become more readily appreciated as the same become better understood by reference to the following detailed description, when taken in conjunction with the accompanying drawings.

DETAILED DESCRIPTION

Application of cosmetics and makeup in patterns and shapes can be difficult by hand. For example, intricate designs and theatrical makeup are typically applied by certified makeup professionals. Additionally, self-application can be a challenge generally for those with limited mobility or vision. Even relatively simple cosmetic designs can include layering of multiple cosmetic products, blending, and application of cosmetics that are specific to a shape type of a face or facial feature. For example, makeup or other cosmetics are typically applied to an oval face in a different configuration than an application to a rectangular or oblong face. In this way, simply mapping a static texture object, such as a texture mask, onto a surface fails to reproduce the aesthetic effect of a cosmetic design as it would be applied to the surface. Additionally, the precise order and extent of operations making up a cosmetic routine typically cannot be determined from an image of the finished design. To that end, makeup tutorials are typically provided as videos or step-by-step guides with images showing the design at multiple intermediate states, leading to the final effect. Even then, face shape-specific tutorials and skin tone specific tutorials are more effective than general tutorials at demonstrating a particular cosmetic design. Such approaches, however, can be time consuming to view and difficult to reproduce without proper tools and experience with each of the specific techniques and cosmetic formulations used.

Techniques are described for generating an augmented reality cosmetic design filter from a cosmetic routine applied to a target body surface of a biological subject, such as a subject's face or other region of interest. Described embodiments employ image sensors to define one or more 3D contour mappings of the target body surface. In the context of such applications, described embodiments provide improved precision and greater ease of use over complex manual routines. The techniques, therefore, improve the manual application of cosmetics through distribution of dynamic augmented reality cosmetic design filters that can be automatically (e.g., without human intervention) adapted for shape type and skin tone. The filters can reproduce step-by-step cosmetic routines, including augmented reality renderings of specific tools, application traces, and finished effects in a manner that is sensitive to shape type and skin tone of the end user of the augmented reality filters.

In an illustrative example, a user of a smartphone creates a video of their makeup routine that produces a particular aesthetic effect. As part of making the video, the smartphone captures images and a surface mapping of the user's face. Initial images are used to generate a baseline with which subsequent applications of cosmetics, such as foundation, highlight, filler, eyeshadow, blush, mascara, or the like, can be detected. While the video is being made, the smartphone iteratively redefines the baseline as part of defining each new application as a new layer of a cosmetic design and recognizes new applications by detecting motion of the user's hand, identifying a new tool or formulation, and/or detecting a color shift on the user's face in reference to the updated baseline. Over the course of the routine, a multi-layer dynamic filter is generated including motion, texture, and/or transparency information. The dynamic filter is referenced to a face shape of the creator of the makeup video and is stored on a distributed storage network. The filter is available to different users for virtual projection through an augmented reality interface. The filter can be used to reproduce layer effects, to realistically map a cosmetic design onto a different face shape, and to guide a viewer through a cosmetic routine in a way that is specific to the viewer's face shape and skin tone, as described in the paragraphs, below.

FIG. 1 is a schematic diagram illustrating an embodiment of an example system 100 for generating an augmented reality cosmetic design filter 110, in accordance with various embodiments. The example system 100 includes one or more client computing devices 130, a camera 140, one or more remote computer systems 160, also referred to as server(s), and one or more user devices 190. As part of the example system 100, the constituent system components can be operably coupled through wireless communication and/or through wired communication. In some embodiments, constituent components can communicate directly through wireless pairing (e.g., Bluetooth) and/or via a local wireless network (e.g., through a wireless router). In some embodiments, constituent components can communicate over one or more networks 170, which can be or include a public network (e.g., the internet) or a private network (e.g., an intranet). In this way, the example system 100 can include multiple distinct devices configured to communicate electronic information through wireless connections. Additionally or alternatively, some of the constituent components can be integrated into a single device.

For clarity of explanation, the augmented reality cosmetic design filter 110 is also referred to as the cosmetic design 110. The cosmetic design 110 is a numerical representation of a cosmetic routine including a set of textures, mapping data, surface information, and metainformation that is stored in memory of the client computing device(s) 130, the server(s) 160 and/or the user device(s) 190. Rather than a single texture reproducing a final result of a makeup routine on a particular face that is projected onto a flat plane and used subsequently as a texture mask, the cosmetic design 110 includes one or more traces 115 that are referenced to contour maps of relevant facial features 120 and/or to baseline features 125 of the target region. The cosmetic design 110 can also include data describing dynamic elements 117 of the traces 115. In this way, the cosmetic design 110 can be deployed to a user device 190 as an animated augmented reality filter reproducing, step-by-step, the layer-wise application of the cosmetic design 110.

As an illustrative example, the client computing device 130 can incorporate the camera 140. Similarly, the example system 100 can include multiple client computing devices 130, where a first client computing device 130 is a mobile electronic device (e.g., a tablet, smartphone, or laptop) that is configured to host user interface elements and to connect to the server(s) 160 over the network(s) 170, while a second client computing device 130 is integrated with the camera 140 and is configured to coordinate operation of the camera 140 with the first client computing device 130. The constituent components of the example system 100 can be provided with computer-executable instructions (e.g., software, firmware, etc.) to implement and coordinate the operation of one or more features of the example system 100. In this way, the operation of the example system 100 can be coordinated via a user interface, accessed via one or more of the constituent components.

The client computing device(s) 130 can be or include a purpose-built mobile computing device including the camera 140, one or more electromagnetic (EM) radiation sources (illustrated as part of the camera 140), and one or more user interface elements 131 to prompt a biological surface 180 with visual and/or auditory prompts. For example, the interface elements 131 can be or include a display 133 to generate a visual representation of the cosmetic design 110. The interface elements 131 can also include user input components including, but not limited to, touch screen, keyboard, trackpad, or mouse. In this example, the components of the client computing device 130 can be integrated into a housing resembling a consumer cosmetic product such as, for example, a bathroom or vanity mirror. In this example, the housing can conceal power sources, heat management systems, and other components.

While the client computing device 130 and camera 140 are illustrated in a particular configuration, additional and/or alternative form factors are contemplated. For example, the system 100 can include a smartphone or tablet computer in communication with the client computing device 130, such that one or more computer-executable operations are undertaken by the smartphone or tablet computer. In this way, image generation operations can be executed by a smartphone incorporating the camera 140 and image processing operations can be executed at least in part on a separate device, such as the server(s) 160.

In some embodiments, the camera 140 can be or include multiple sensors and/or sources including, but not limited to a visible light image sensor 141, a depth sensor 143 and/or a source of invisible EM radiation 145, including but not limited to infrared or near-infrared radiation. As with the client computing device(s) 130, the camera 140 can include communication circuitry 147 to enable wireless communication and/or pairing with the other constituent components of the example system 100. While the camera 140 is illustrated as a separate component of the example system 100, the camera 140 can also be integrated into one of the other constituent components of the example system 100. For example, the client computing device 130 can incorporate the camera 140 (e.g., as a smartphone or tablet)

The depth sensor 143 can capture one or more images of the biological surface 180, including, but not limited to, images of a target body surface 181 of the biological surface 180. In the illustration provided in FIG. 1, the biological surface 180 is a human using the example system 100 to create the cosmetic design 110 and the target body surface 181 is the face of the human in the region around the eye and eyebrow. The depth sensor 143 can generate a surface mapping 183 of the target body surface 181. Contours and depth information for the target body surface 181 can vary over time or between users, and the camera can generate the surface mapping 183 as part of operations for extrapolating, modifying and/or generating the cosmetic design 110 by the client computing device(s) 130.

The depth sensor 185 can be an image sensor and can capture images within a field of view 185 including the target body surface 181. The depth sensor 143 can be or include, but is not limited to, a laser-based sensor (e.g., LiDAR), a time-of-flight camera, a structured light generator, a visual simultaneous localization and mapping (vSLAM) sensor assembly including motion sensors and visible image cameras, or an ultrasound-based sensor assembly, such that the camera 140 can generate the surface mapping 183.

For example, where the depth sensor 143 is an infrared depth sensing camera, the source of invisible EM radiation 145 can be or include an infrared source that exposes the biological surface 180 including the target body surface 181 to structured invisible infrared radiation. In another example, where the depth sensor is a LiDAR system or a time-of-flight camera, the source of invisible EM radiation 145 can be or include an infrared diode laser. In this way, the EM radiation generated by the source of invisible EM radiation 145 can be scanned or otherwise directed toward the target body surface 181 over an angular spread 187, such that the target body surface 181 is exposed. In some embodiments, detection of the target body surface 181 is facilitated and/or enabled by feature and/or edge detection applied to visible spectrum (e.g., RGB) images captured by the visible light sensor 141 (e.g., by vSLAM techniques).

The surface mapping 183 can provide contour information and/or position information for features in the target body surface 181, for example, precise information about the relative position of the eyebrow ridge and the bridge of the nose, where the eyebrow begins and ends relative to the eye, etc. In this way, the surface mapping 183 can be used to generate, and/or extrapolate the cosmetic design 110 for deploying to a social media platform or other service to distribute the cosmetic design 110 to users via user device(s) 190. In this way, the cosmetic design 110 can be represented as a data file that is communicated to the server(s) 160, for example, as part of an online platform and/or database of cosmetic designs.

The surface mapping 183 can be used to modify the cosmetic design 110 by determining a shape type of a feature of the biological surface 180 and transforming the cosmetic design 110 to another, different shape type. In some embodiments, multiple layers are defined as part of generating or modifying the cosmetic design 110. The example system 100 can implement the example techniques described in reference to FIGS. 2-6 to detect an application of multiple cosmetic formulations to the target body surface 181 and can generate one or more traces 115 describing the applications spatially and temporally that together define the cosmetic design 110.

Advantageously, the cosmetic design 110 can be distributed to the user device(s) 190 as an augmented reality filter, for example, through integration with social media, with improved accuracy and precision by mapping both the target body surface 181 and a corresponding region of a user of the user device 190, and by extrapolating the cosmetic design 110, or each constituent layer of the cosmetic design 110, to fit the corresponding region. Additionally, the cosmetic design 110 can be presented dynamically, in the form of a tutorial visualization, whereby both layers and traces are animated to demonstrate layers, motions, colors, and other cosmetic aspects of the cosmetic design 110. In this way, the cosmetic design 110 represents an improvement to user experience by adapting the cosmetic design 110 from the creator to the user, and also represents an improvement to system performance, as the complete cosmetic design 110 can be transferred as mask data rather than as image data. As such, data volumes and computational resources involved in distributing the cosmetic design 110 over the network(s) 170 and storing on the server(s) 160, are reduced.

Figure 2:
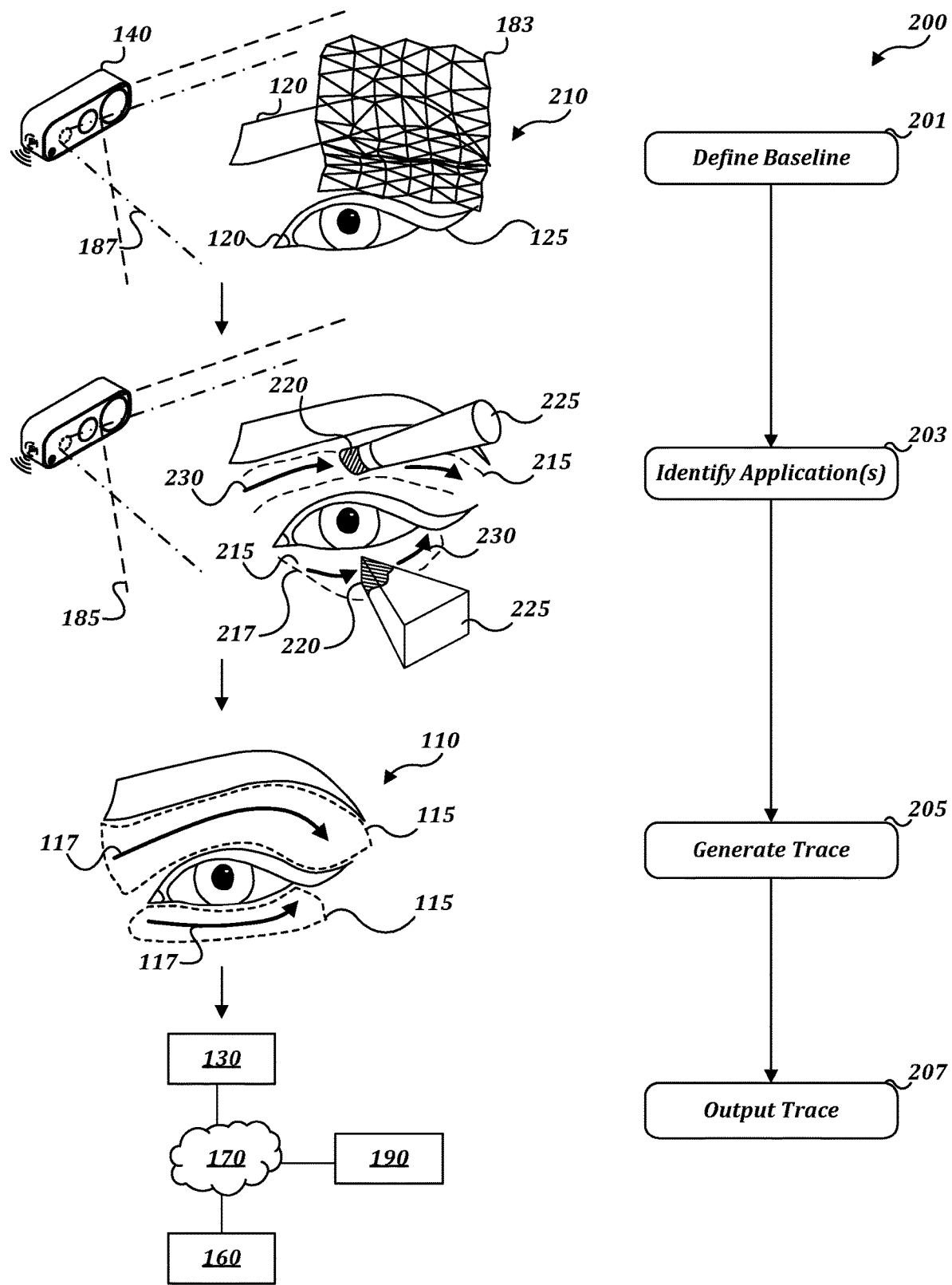
FIG. 2 is a schematic diagram illustrating an example technique for preparing an augmented reality cosmetic design filter, in accordance with various embodiments.

FIG. 2 is a schematic diagram illustrating an example process 200 for preparing the augmented reality cosmetic design filter 110, in accordance with various embodiments. The example process 200 can be implemented as a number of operations executed or otherwise performed by constituent components of the example system 100 of FIG. 1. In this way, the operations can be or include operations performed by one or more processors of a computer system, such as client computing device(s) 130 of FIG. 1, in response to execution of computer-readable instructions stored on non-transitory memory of the computer system. While the operations are illustrated in a particular order, the example process 200 can include more or fewer operations, and the order of operations can vary. In some embodiments, some operations are performed by different physical computers, as described in more detail in reference to FIG. 1. For example, some operations can be performed by different components interchangeably or can be performed by coordinated operation of two or more components.

At operation 201, the computer system defines a baseline description 210 of the biological surface 180. In some embodiments, the baseline description 210 is defined as part of generating the surface mapping 183, for example, by referencing visible color information to surface contour mapping information describing the biological surface 180. In this way, the baseline description 210 can include numerical representations (e.g., digital data) of the biological surface 180 including both the surface mapping 183 and color information. The example process 200 is illustrated in the context of the target body surface 181 of FIG. 1, but it is understood that the biological surface 180 can be or include a face, a hand, a portion of a face, or other surface to which a cosmetic formulation is applied.

In some embodiments, defining the baseline description 210 includes generating one or more images of the biological surface 180, using the camera 140 or other radiation sensors that are configured to detect visible light or invisible EM radiation. Invisible EM radiation can be projected onto the biological surface 180 using a radiation source of the camera 140, such as a structured light generator, LiDAR source, or ToF camera source. For example, the images can describe facial features 120 of the biological surface 180 as well as baseline features 125. Baseline features 125 can be or include materials applied to the biological surface 180 prior to example process 200, such that at least a portion of the biological surface 180 includes a pigment, cosmetic formulation, or other feature that is detectable by the camera 140. For example, baseline features 125 are illustrated as eyelashes and eyeliner. Similarly, baseline features 125 can include, but are not limited to, blemishes, wrinkles, scars, or other aesthetic aspects of the biological surface 180 other than facial features 120. Facial features 120, by contrast, refer to organs, hair, and other topographical features of the biological surface 180 that define the surface mapping 183 and influence the baseline description 210 through physical effects including, but not limited to, shadows, perspective, or the like.

At operation 203, the computer system identifies one or more applications 215 of cosmetic formulation(s) 220 to the biological surface 180. The cosmetic formulation(s) 220 can include, but are not limited to, makeup, mascara, lipstick, lipliner, eyeliner, glitter, aesthetic creams, ointments, or other materials that can be applied topically to the biological surface 180. The application(s) 215 of the cosmetic formulation(s) 220 can be detected by the camera 140 using radiation sensors, such as visible light sensors, invisible EM radiation sensors, or the like. In this way, the application(s) 215 can be detected as a shift in the biological surface relative to the baseline description, for example, in terms of coloration, surface reflectivity, or absorbance/reflectance of invisible EM radiation. In an illustrative example, a glossy lip coating can be detected through an increase in specular reflection of the biological surface 180 relative to the baseline description that includes negligible specular reflection. Similarly, a matte foundation can be detected through a decrease in specular reflection and an increase in diffuse reflection relative to the baseline description. In a non-limiting example, specular reflection can be detected by defining a luminance channel in visible light images and thresholding the luminance channel, where specular reflection is defined as a luminance value exceeding the threshold, on a pixel-wise basis.

In some embodiments, the computer system detects an applicator 225, such as a brush, sponge, pencil, finger, or other applicator 225 in proximity to the biological surface 180. In some embodiments, the computer system recognizes an identifier of the applicator 225, for example, where the applicator 225 includes a registration mark such as a barcode, QR code, RFID tag, or other representation of the identifier information. In this way, the computer system can identify the application 215 spatially and temporally and can identify the cosmetic formulation(s) 220. To that end, operation 203 can optionally include identifying the cosmetic formulation 220 and defining a color of the cosmetic formulation 220 using the identifier information of the cosmetic formulation 220. For example, while the color of an unidentified cosmetic formulation 220 can be estimated using the camera 140, as described in more detail in reference to FIG. 6, identifying the applicator 225 can permit the computer system to directly determine the color of the cosmetic formulation 220 where the applicator 225 is loaded with a particular cosmetic formulation 220, rather than being a multi-purpose applicator 225. Examples of applicators 220 for which the cosmetic formulation 220 can be identified in such a manner include, but are not limited to, pencils, lipsticks, gel applicators, or other applicators 220 that are available with a prepared cosmetic formulation 220. The application 215 of cosmetic formulation 220 can include a motion 230 of the applicator 225 relative to the biological surface 180. The motion 230 can include meaningful information with respect to the aesthetic effect of the overall cosmetic design 110, such as in blending and smudging motions. As such, motions 230 of applicators 220 can be detected and used during operations for generating traces.

Applications 215 can also include modifications or manipulations of formulations 220 already disposed on the biological surface 180. For example, the extent, coloration, and reflectance of a cosmetic formation 220 can be modified by smoothing, smudging, blending, spreading, or other techniques. Such applications 215, not adding a new formulation 220 to the biological surface 180, but rather modifying an already disposed formulation 220, can be identified by detecting a tool or a finger, and detecting a change in the biological surface 180 relative to the baseline description 210. As described in reference to FIG. 1, the baseline description 210 can be relative to each respective application 215, where applications 215 are layered and/or blended. For example, the baseline description 210 for a particular region of the biological surface 180, to which a formulation 220 is already applied, can be redefined to include the formulation 220. In this way, subsequent applications 215 can be more precisely and accurately detected.

At operation 205, the computer system generates one or more traces 115 describing the application 215 identified at operation 203. Generating the traces 115 can include determining an extent 217, layer sequence (see FIG. 5), and coloration (see FIG. 6) of the applications 215, such that the cosmetic design 110 can realistically reproduce the aesthetic effect of the applications 215 and can also reproduce the sequence of the applications 215. The extent 217, coloration, and layer sequence information, as well as other information relevant to realistically reproducing the traces 115 on user device(s) 190, can be encoded as numerical representations, such as intensity datasets referenced to the baseline description 210. For example, the extent 217 of the applications 215, illustrated as dashed lines in FIG. 2, can be detected as a shift in coloration, a shift in absorbance and/or reflectivity of EM radiation relative to the baseline description. In this way, the traces 115 can reproduce the aesthetic effect of individual applications 215.

In some embodiments, the computer system tracks the motion 230 of the applicator using images and or contour data generated by the camera 140. Generating the traces 115, therefore, can include generating numerical representations of the various motions 230 relative to the biological surface 180, as described in the baseline description, as well as the color information describing the cosmetic formulations 220 used in the applications 215. The traces 115, once generated, can be transformed to reproduce the aesthetic effect of the cosmetic design 110 on differently shaped biological surfaces 180, as viewed through user device(s) 190, described in more detail in reference to FIG. 3.

Traces 115 can encode layer-blending and layering information, such that the combination of multiple traces 115 can reproduce interactions between traces 115. For example, a set of applications 215 to a region of the biological surface 180 between the eye and eyebrow of multiple eyeshadow colors can be blended to impart a color gradient in an eyeshadow region. In this example, the example process 200 includes multiple iterations of operations 201-205, such that the region between the eyebrow and the eye are described by multiple traces 115 and also by interaction terms that describe how the multiple traces relate. In some embodiments, traces 115 include transparency information, such as alpha channel information, referenced to dynamic elements 117 that describe localized transparency of coloration or other aesthetic effects of the applications 215. In this way, traces 115 can reproduce manipulation of the cosmetic formulations 220, such as blending, smudging, smoothing, or other techniques that are typical of cosmetic designs. In an illustrative example, traces 115 and/or dynamic elements 117 can include a vector of transparency values referenced to a motion 230 and a formulation 220, such that the trace 115 reproduces a smoothing or blending of the formulation 220 based on the motion 230.

At operation 207, the computer system outputs the trace(s) 115 detected as part of operations 201-205. Outputting the trace(s) 115 can include electronic operations including, but not limited to, storing the trace(s) 115 in a local data store of the client computing device 130, transferring the trace(s) 115 to server(s) 160 via the network 170, and or sharing the trace(s) 115 with the user device(s) 190 directly (e.g., through electronic pairing) or via the network 180.

While the description of the example process 200 has focused on cosmetic designs for eyebrow/eye regions, the operations can similarly be applied to other surfaces. For example, the cosmetic design 110 can describe applications 215 of cosmetic formulations 220 to additional/alternative surfaces including, but not limited to, lips, nose, cheeks, forehead, or hands. Similarly, cosmetic designs 110 can modify the appearance of facial features 120, including but not limited to eyebrows, eyes, lips, cheekbones, jawline, or hands. In another illustrative example, a cosmetic design 110 can include a sequence of traces 117 for emphasizing the appearance of cheekbones through application of one or more cosmetic formulations 120.

Figure 3:
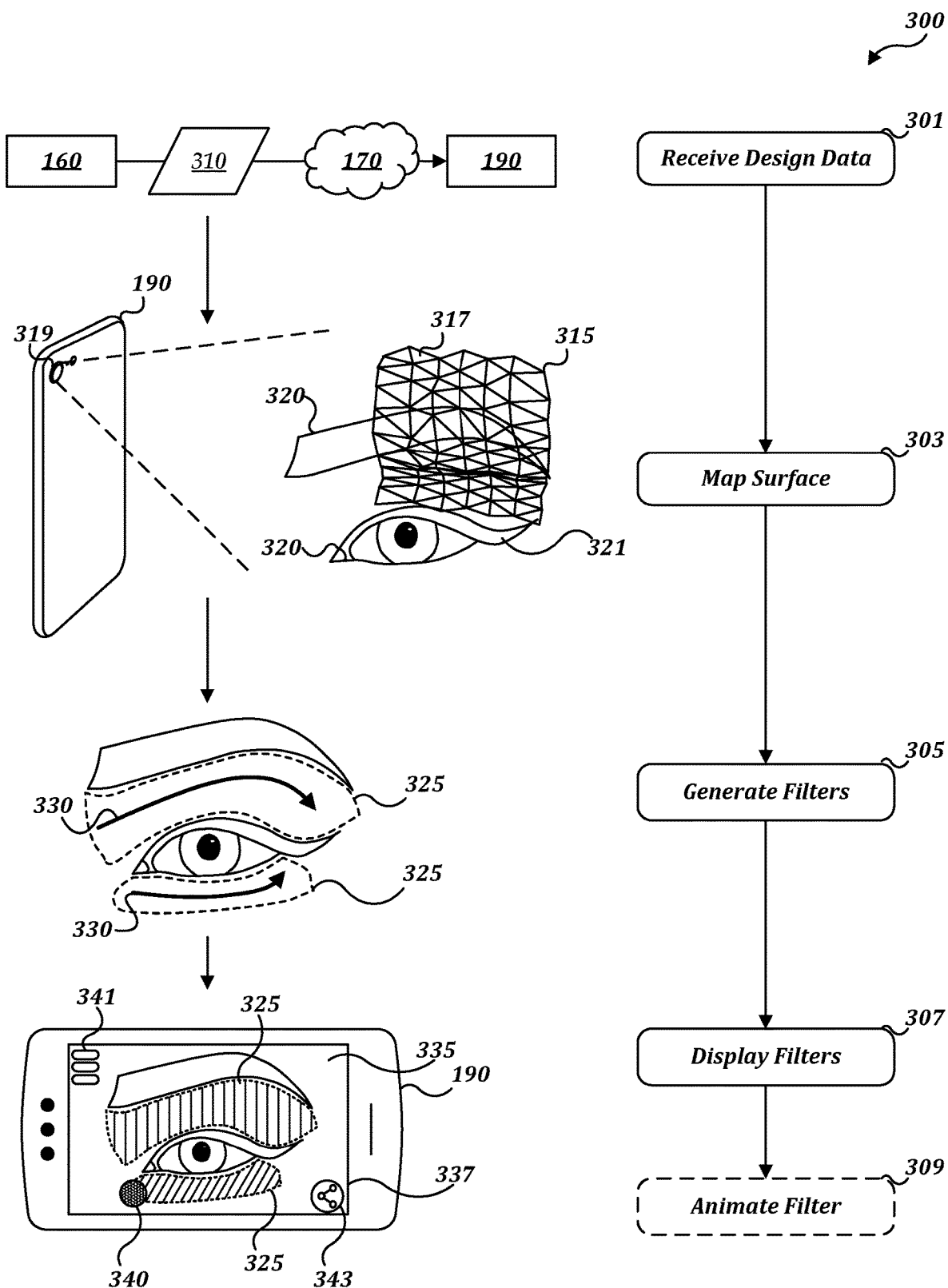
FIG. 3 is a schematic diagram illustrating an example technique for deploying an augmented reality cosmetic design filter, in accordance with various embodiments.

FIG. 3 is a schematic diagram illustrating an example process 300 for deploying the augmented reality cosmetic design filter 110, in accordance with various embodiments. As with example process 200 of FIG. 2, the example process 300 can be implemented as a number of operations executed or otherwise performed by constituent components of the example system 100 of FIG. 1. In this way, the operations can be or include operations performed by one or more processors of a computer system, such as user device(s) 190 of FIG. 1, in response to execution of computer-readable instructions stored on non-transitory memory of the computer system. While the operations are illustrated in a particular order, the example process 300 can include more or fewer operations, and the order of operations can vary. In some embodiments, some operations are performed by different physical computers, as described in more detail in reference to FIG. 1. For example, some operations can be performed by different components interchangeably or can be performed by coordinated operation of two or more components, such as user device(s) 190 and server(s) 160.

At operation 301, a user device 190 receives data 310 describing the cosmetic design 110. Receiving the data 310 can include electronic communication over the network 170 (e.g., the internet, a cellular network, or the like), but can also include direct communication through pairing or other approaches. In FIG. 3, the user device 190 is illustrated receiving the data 310 from server(s) 160, but it is understood that the data 310 can be received from the client computing device(s) 130. The data 310 can include traces 115 generated during one or more iterations of the example process 200, as described in more detail in reference to FIG. 2, and can also include metainformation describing the biological surface 180, such as a shape-type of the biological surface 180, as described in more detail in reference to FIG. 4.

Operations for receiving the data 310 can include one or more data transfer techniques including, but not limited to, wireless communication or wired communication. For example, the user device 190 can communicate wirelessly with the client computing device 130 to receive the data 210 as a wireless transmission.

In some embodiments, receiving the data 310 can include a browser environment, such as a recommendation engine, whereby a user of the user device 190 can view a set of cosmetic designs 110 generated by one or more creators, rather than directly communicating with the creators to request the design. Additionally or alternatively, the data 310 can be pushed to the user device 190, for example, as part of a social media service to which the user of the user device 190 can register, follow, and/or subscribe. In some embodiments, the data 310 is recommended based at least in part on identifier information describing the user of the user device 190. Where the user of the user device 190, through historical traffic data, demonstrates an aesthetic preference, cosmetic designs 110 reflecting that preference can be preferentially recommended. Demographic, socio-economic, or biometric data can also be used to recommend cosmetic designs 110. For example, where the user of the user device 190 resides in a geographic region, cosmetic designs 110 reflecting the trends for the geographic region can be recommended. Similarly, where the user of the user device 190 is within a given age range, is employed in a given field or sector, or is a part of a given social network, cosmetic designs reflecting trends corresponding to each respective category can be identified and recommended.

At operation 303, the user device 190 maps a user surface 315 corresponding to the biological surface 180, to which the cosmetic design 110 will be virtually applied. Mapping the user surface 315 can include operations similar to those described in reference to generating the surface mapping 183 of FIG. 1, including but not limited to structured light methods, LiDAR or ToF methods, vSLAM methods, ultrasonic methods, or the like. The surface 315 can be described by a mesh of polygons 317 that can each define multiple properties for the corresponding region of the surface 315 including, but not limited to, tone, reflectance, temperature, or the like.

Where the user device 190 is a smartphone incorporating depth sensors 319, operation 303 can include executing one or more applications stored in memory of the user device 190 to map the surface using the depth sensors. In this way, the user surface 315 can be represented as a numerical representation in data, describing surface contours and facial features 320 of the user surface 315. In some embodiments, the example process 300 includes integrating the cosmetic design 110 with an existing aesthetic look of the user surface 315. To that end, aesthetic features 321 such as makeup, mascara, eyelashes, or the like, are included during surface mapping.

Figure 6:
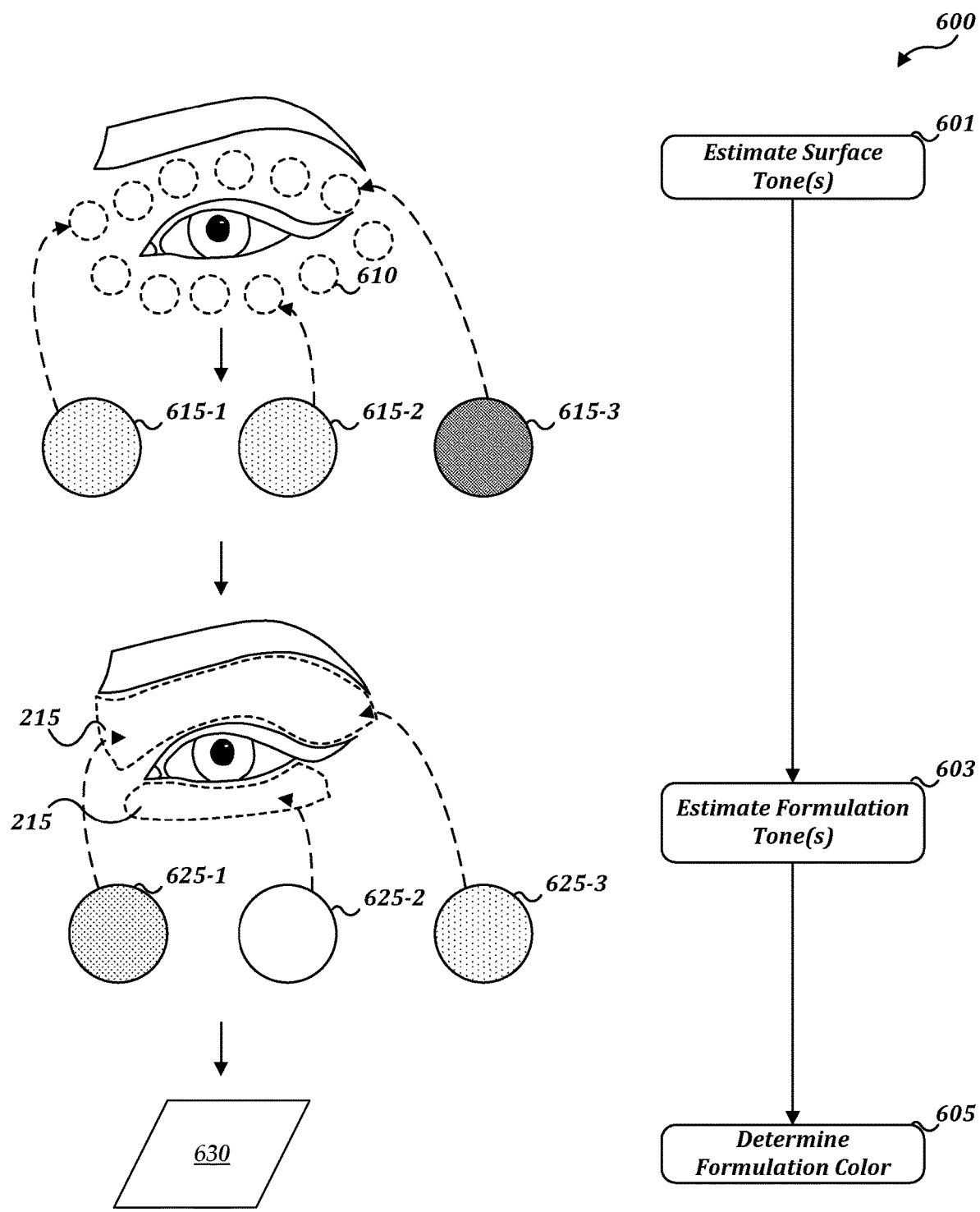
FIG. 6 is a schematic diagram illustrating an example technique for determining a formulation color using surface tones and formulation tones, in accordance with various embodiments.

Mapping the user surface 315 can also include estimating a surface tone, which can be a local surface tone, as described in more detail in reference to FIG. 6. In this way, the example process 300 can account for a difference in skin tones between the biological surface 180 and the user surface 315. For example, metadata provided as part of the data 310, or alternatively as stored in memory of the server(s) 160 and/or the user device 190, can include reference or lookup tables cross-referencing colors to skin tones, such that the cosmetic design 110 can be adapted to reproduce the aesthetic effect of the cosmetic design 110, rather than the literal transposition of exact colors.

At operation 305, the traces 115 received as part of the data 310 are used to generate filters 325, referenced to the mapping of the user surface 315 generated at operation 303. The filters 325 can be or include numerical representations, such as texture objects, that are formatted to be combined with the mapping of the user surface 315. In an illustrative example, the user surface 315 is described by a mesh of polygons 317 and a filter 325 is referenced to the polygons 317, such that each polygon 317 defines a vector of values describing the appearance of the filter 325.

In some embodiments, the filters 325 include dynamic elements 330, such as animation effects or interlayer-effects, that can be used to demonstrate the sequence of applications 215 used to create the cosmetic design 110. Dynamic elements 330 can reproduce at least a part of the dynamic elements 117 described in reference to the traces 115 in FIGS. 1-2.

At operation 307 the computer system presents the filters 325 integrated with images 335 of the user surface 315. Presenting the filters 325 can include displaying the filters 325 through a screen 337. For example, the user device 190 can be a smartphone or a tablet including a touchscreen display. The filters 325 can be mapped to the user surface 315 in real time or near real time using feature tracking or other augmented reality techniques, where "near real time" describes a qualitative experience by a user of the user device 190 whereby latency introduced by the operations of the example process 300 are effectively imperceptible.

The filters 325 can be presented as interactive graphical elements that a user of the user device 190 can manipulate through the screen 337, for example, by selecting or highlighting. In some embodiments, selecting a filter 325 can initiate animation of dynamic elements 330 at optional operation 309. Additionally or alternatively, animating the filters 325 can include initiating a virtual tutorial whereby filters 325 are presented in sequence by layer-order, such that the sequence of applications 215 is reproduced on the user surface 315. The sequence can be paused, reversed, advanced, or otherwise manipulated via the user device 190, and specific dynamic elements can be activated by selecting a filter 325, for example, with a user action 340 on the screen 337.

In some embodiments, interaction with the screen 337 while the filters 325 are being presented permits the user of the user device 190 to edit, add, or remove one or more filters 325. Different user actions 340, instead of activating dynamic elements, can initiate one or more alternative processes. For example, a double finger tap can open a menu 341 that permits the user of the user device 190 to view information describing the applicator 225, the cosmetic formulation 215, or other information describing the filter 325. Similarly, a press-and-hold on the filter 325 can cause the user device 190 to access an online marketplace to permit the user to purchase the cosmetic formulation 220, the applicator 225, or other consumer products. In some embodiments, a menu of social media controls 343 can be generated, such that the user of the user device can share the image 335 with the filters 325, can communicate with other users, or can provide feedback or otherwise communicate with the creator of the cosmetic design 110. It is understood that the types of user actions described are exemplary. User interface elements, such as the menu 341 and/or the social media menu 343 can be summoned by alternative and/or additional interactions. In some embodiments, menu elements are presented on the display 337 by default.

Figure 4:
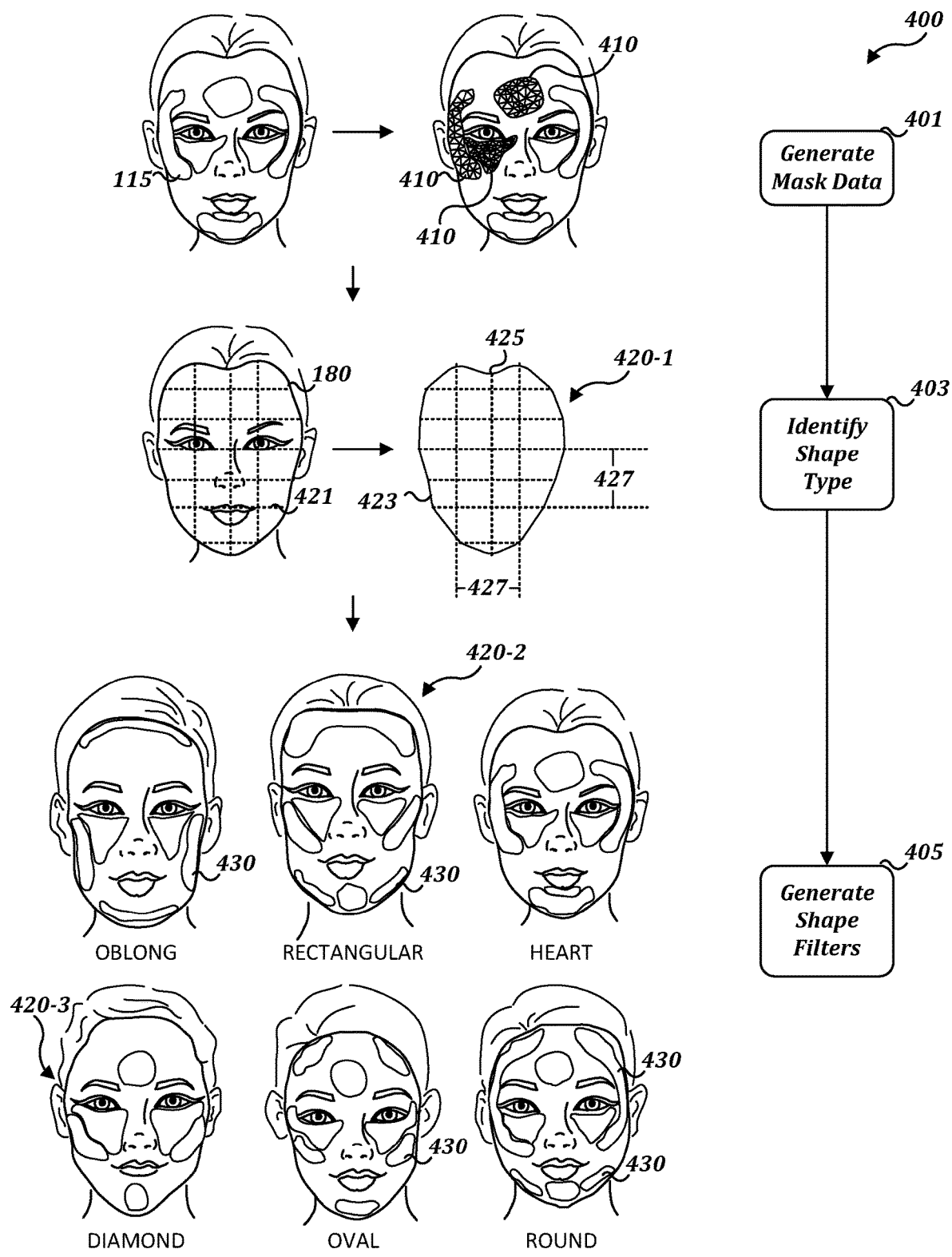
FIG. 4 is a schematic diagram illustrating an example technique for transforming an augmented reality cosmetic design filter from one shape type to another shape type, in accordance with various embodiments.

FIG. 4 is a schematic diagram illustrating an example process 400 for transforming the augmented reality cosmetic design filter 110 from one shape type to another shape type, in accordance with various embodiments. As with the example processes 200 and 300, the example process 400 can be implemented as a number of operations executed or otherwise performed by constituent components of the example system 100 of FIG. 1. In this way, the operations can be or include operations performed by one or more processors of a computer system, such as client computing device(s) 130, server(s) 160, and/or user device(s) 190 of FIG. 1, in response to execution of computer-readable instructions stored on non-transitory memory of the computer system. While the operations are illustrated in a particular order, the example process 400 can include more or fewer operations, and the order of operations can vary. In some embodiments, some operations are performed by different physical computers, as described in more detail in reference to FIG. 1. For example, some operations can be performed by different components interchangeably or can be performed by coordinated operation of two or more components.

The traces 115 are generated in reference to the baseline description 210, as described in more detail in reference to FIG. 2, and as such are specific to the biological surface 180. The example process 400, therefore, describes operations for extrapolating the filters 325 from a first face shape to a second face shape, as part of generating the traces 115 and/or the filters 325. While the description in reference to FIG. 4 focuses on face shapes, it is understood that the operations can similarly be applied to shapes of individual facial features, such as eye shapes, mouth shapes, or other feature shapes, such that the traces 115 are transformed to realistically reproduce the aesthetic effect of the traces 115, rather than simply applying the traces 115 as a texture to the user surface 315.

At operation 401, the computer system generates mask data 410 using one or more traces 115. Where traces 115 are relative to topographical data describing the biological surface, generating the mask data 410 includes projecting the data describing the applications 215 onto the topographical data describing the biological surface 180, thereby permitting the modification of the traces 115 from one shape type 420 to another shape type 420.

At operation 403, the computer system attributes a first shape type 420 to at least a portion of the biological surface 180. For example, the computer system can reference shape information describing multiple shape types 420. The shape information can be stored on, accessed, or otherwise received from server(s) 160 or client computing device(s) 130. In this way, example process 400 can include receiving information describing the multiple shape types 420.

Attributing the shape type 420 to the biological surface 180 can include referencing the baseline description 210 to determine characteristic dimensions, spacings, or other aspects of the biological surface 180 that indicate the shape type 420. In the illustrative example of a face shape, characteristic aspects can be defined by projecting a grid or other form of guide 421 onto the baseline description 210, such that the shape type 420 can be identified, either by defining an outline 423 of the baseline description 210, by identifying a characteristic curvature 425 at one or more points of the baseline description 210, or by identifying characteristic spacings 427 between features. It is understood that approaches involving edge detection and feature detection using computer image processing techniques can be employed to attribute the shape type 420.

At operation 405, the computer system generates one or more shape filters 430 for different shape types 420. As part of generating the shape filters 430, the mask data 410 generated at operation 401 is transformed from the first shape type 420-1 to a second shape type 420-2, a third shape type 420-3, or additional or alternative shape types 420. Transformation of the mask data 410 can include but is not limited to projecting the mask data 410 of the first shape type 420-1 onto the topographical data of the second shape type 420-2, and applying the corresponding transformation onto the traces 115. In this way, the shape filters 430 will reproduce the aesthetic shape and coloration of the traces 115 onto shape types 420 different from the first shape type 420-1.

In some embodiments, generating shape filters 430 for different shape types 420 can include additional modifications to the mask data 410, beyond spatial projection to account for different physical shapes. For example, some shape types 420 are characterized by more or less pronounced facial features, such as brow ridges, forehead curvature, chin shape, cheekbones, jaw shape, or the like. To that end, shape filters 430 can reposition, divide, omit, duplicate, mirror, or otherwise transform mask data 410 as part of generating shape filters 430. In an illustrative example, generating the shape filters 430 for a second shape type 420-2 corresponding to a rectangular face shape from the first shape type 420-1 corresponding to a heart face shape includes repositioning a forehead trace upward toward the hairline and widening the forehead trace to either edge of the forehead, as well as dividing and mirroring a chin trace along the jawline. Corresponding transformations can be applied to the mask data 410 for each of the traces 115 as part of generating the shape filters 430 for each shape type 420.

In the context of facial features, where the cosmetic design 110 is addressed at a specific facial feature (e.g., an eyeshadow design between an eyebrow and an eye), the constituent operations of the example process 400 can be applied based on similar principles. For example, where the cosmetic design 110 is created in reference to a rounded eye shape type 420, generating shape filters 430 at the operation 405 can include transforming mask data 410 from the rounded eye to an almond eye shape type 420 or other eye-specific shape types 420. It is understood that corresponding operations can be applied to shapes of lips, hands, ears, or other biological surfaces.

Figure 5:
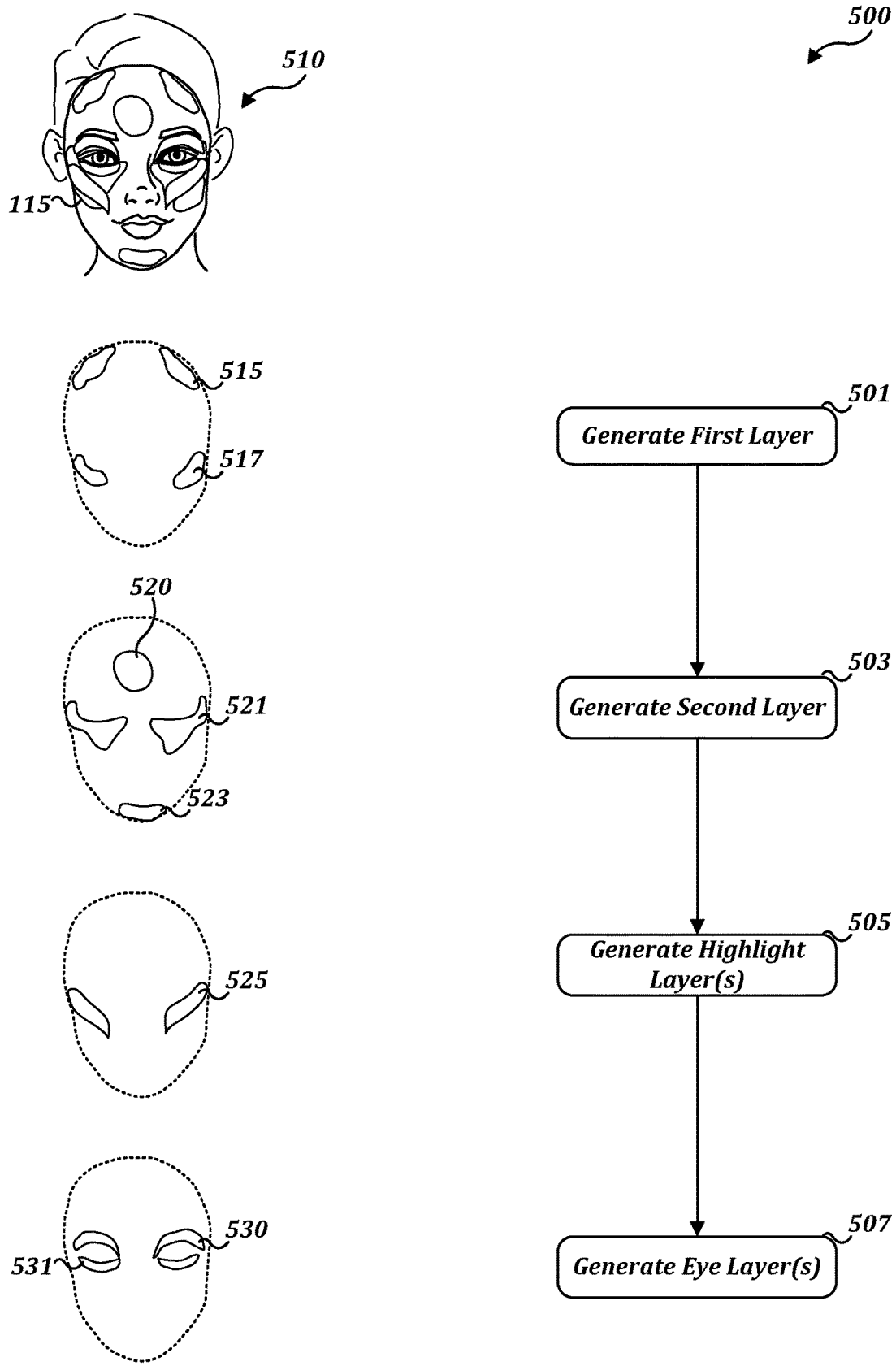
FIG. 5 is a schematic diagram illustrating an example technique for generating an augmented reality cosmetic design filter in multiple layers, in accordance with various embodiments.

FIG. 5 is a schematic diagram illustrating an example process 500 for generating an augmented reality cosmetic design filter 510 in multiple layers, in accordance with various embodiments. As with the example processes 200, 300, and 400, the example process 500 can be implemented as a number of operations executed or otherwise performed by constituent components of the example system 100 of FIG. 1. In this way, the operations can be or include operations performed by one or more processors of a computer system, such as client computing device(s) 130, server(s) 160, and/or user device(s) 190 of FIG. 1, in response to execution of computer-readable instructions stored on non-transitory memory of the computer system. While the operations are illustrated in a particular order, the example process 500 can include more or fewer operations, and the order of operations can vary. In some embodiments, some operations are performed by different physical computers, as described in more detail in reference to FIG. 1. For example, some operations can be performed by different components interchangeably or can be performed by coordinated operation of two or more components.

As described in more detail in reference to FIGS. 1-3, the traces 115 can be generated by recording the sequential application of multiple cosmetic formulations 220 to the biological surface 180, such that the augmented reality cosmetic design filter 510 can be segmented into discrete layers. The presentation of the filter 510, as described in more detail in reference to FIG. 3, can reproduce the layer-wise sequence of applications. Similarly, the example process 400 can also incorporate the layer-wise aspects of the example process 500 where different shape types 420 implicate different layering processes, interlayer blending, as well as more complex light and shadow effects resulting from differences in shape type 420.

At operations 501-507, a sequence of layers are defined, where each layer includes one or more traces 115. For example, at operation 501, a first layer is defined that includes forehead traces 515 and cheekbone traces 517. At operation 503, a second layer is defined that includes forehead trace(s) 520, cheek traces 521, and chin trace(s) 523. At operation 505, highlight layer(s) are defined that include highlight trace(s) 525 to accentuate or emphasize one or more facial features, overlying the first and second layers. At operation 507, eye layer(s) are defined including eyeshadow traces 530 and under-eye traces 531, overlying the highlight layers, the first layers, and the second layers.

In this way, the augmented reality cosmetic design filter 510 can dynamically add or remove layers during presentation on the user device 190. Similarly, the client computing device 130 can associate one or more traces 115 with each of a number of layers. Defining the layers as described in the example process 500 permits interlayer blending rules to be defined. For example, higher-order layers can overly lower-order layers. Higher-order layers can completely occlude lower-order layers. Transparency or partial transparency, defined for example through an alpha channel of the mask data 410, can permit multiple layers to be overlaid in the images 337 to produce a net aesthetic effect including co-localized contributions from multiple layers.

FIG. 6 is a schematic diagram illustrating an example process 600 for determining a formulation color using surface tones and formulation tones, in accordance with various embodiments.

As described in more detail in reference to FIG. 2, detecting the applications 215 of cosmetic formulations 220 can include determining the color or the cosmetic formulations 220 and/or identifying the cosmetic formulations 220. Where techniques for determining the color include image processing operations based on images generated by the camera 140, the colors of the various cosmetic formations 220 can be influenced by the tone of the biological surface 180 in proximity to the applications 215. In this way, direct reading of image pixel values may produce an inaccurate color rendering when used in filters 325.

At operation 601, the computer system meters a number of regions 610 corresponding to the applications 215 and estimates a surface tone 615 of the biological surface 180 for each of the regions 610. In some embodiments, the operations of the example process 600 are executed in parallel with the example process 200, but can also be executed at a different time, using the baseline description 210, images recorded during the generation of the traces 115, or a calibration set of images generated before commencing the example process 200. It is contemplated that surface tones 615 may differ locally between the regions 610, for example, where a facial feature casts a shadow or where the surface defines one or more contours. To that end, the operation 601 can include defining multiple surface tones 610 for a single application 215.

At operation 603, the computer system meters the regions 610 in images including the applications 215 and estimates one or more local formulation tones 625 of the cosmetic formulations 220. Estimating the surface tones 615 and the formulation tones 625 can include sampling one or more pixels in each of the regions 610 and determining an average coloration of each of the regions 610. It is understood that the formulation tones 625 will be influenced by the underlying surface tones 615, such that the surface tones 615 can serve as reference baseline values for estimating formulation tones in a way that is sensitive to skin tone. Advantageously, implementing computer image processing approaches that include estimating the surface tones 615 in this way permits the cosmetic designs 110 to be responsive to skin tones of the user, rather than presenting a static augmented reality mask.

At operation 605, the computer system determines a color 630 of the cosmetic formulation using the surface tones 615 and the formulation tones 625. In contrast to the surface tones 615 and the formulation tones 625, it is contemplated that each cosmetic formulation 220 includes one or more pigments that are uniformly dispersed or distributed, such that the formulation expresses a single visible color, for example, through diffuse reflection of visible light. To that end, the formulation color 630 can be or include a vector of color components, such as an RGB triad or another color representation approach.

As part of the operation 605, corresponding surface tones 615 and formulation tones 625 can be compared, and the overall effect of the surface tones 615 on the formulation tones 625 can be accounted for, as part of determining the color 630 of the cosmetic formulation 220. In an illustrative example, where different regions 610 are differentially illuminated, comparing the surface tones 615 and the formulation tones 625, for example, by using the surface tones 615 to correct for luminance variation in the formulation tones 625, can control for the effect of illumination on color rendering.

It is understood that determining the formulation color 630 can improve the reproducibility of the aesthetic effect of the cosmetic design 110 on different biological surfaces, in different ambient conditions, and with different formulations. As described in more detail in reference to FIG. 2, the formulation color 630 can be modified to account for differences in skin tone between creator and user. Similarly, the formulation color 630 can be modified to improve realistic color fidelity based on ambient conditions. For example, in bright conditions, the color intensity can be increased, while in dim conditions, the color intensity can be decreased. In some cases, tinting can be modified dynamically to account for light and shape. For example, as part of the example process 300, the formulation color 630 can be modified to include a larger blue component to reflect that the trace 115 to which it corresponds is in shade. Conversely, the blue component can be decreased when the corresponding trace 115 is moved into brighter illumination.

As explained throughout the preceding description, the operations for generating, modifying, and/or presenting the traces 115 and the filters 325 are contemplated to be executed by one or more electronic devices including computer circuitry, communication modules, and computer-readable instructions stored in memory. Through the coordinated operation of the constituent elements of the example system 100 of FIG. 1, augmented reality filters can be generated and presented in near real time to users of user devices 190, integrated into social media platforms. The augmented reality filters can realistically reproduce the aesthetic effects of cosmetic designs, accounting for differences in face shape, skin tone, and ambient conditions, and can be presented dynamically to improve the sharing of cometic routine sequences beyond what is currently possible with augmented reality or conventional social media.

Figure 7:
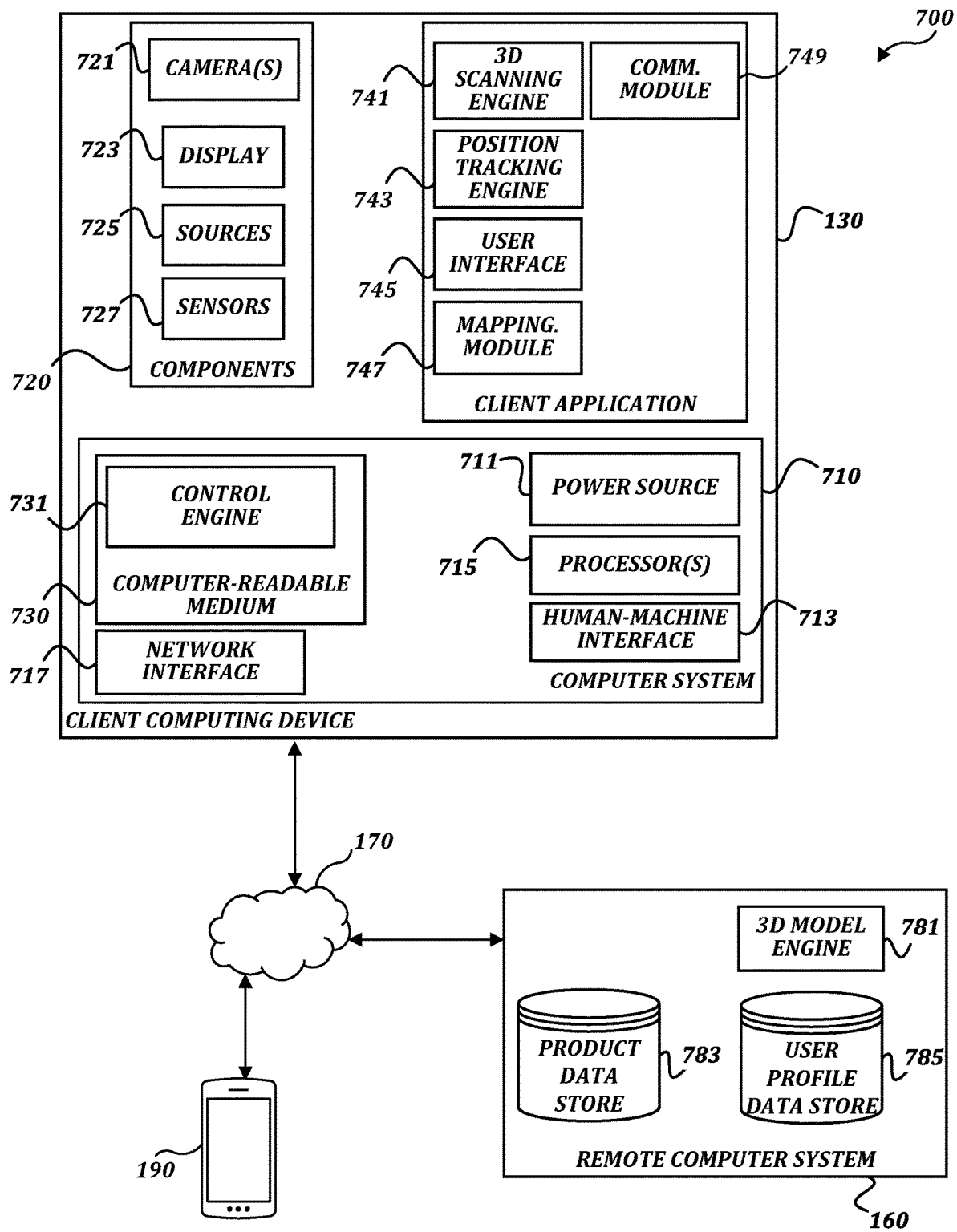
FIG. 7 is a block diagram that illustrates an example system, including components of the system of FIG. 1, in accordance with various embodiments.

FIG. 7 is a block diagram that illustrates an example system 700, including components of the system of FIG. 1, in accordance with various embodiments. The example system 700 includes the client computing device 130 in electronic communication (e.g., over network 170) with the remote computer system 160. Example system 700 illustrates an example of the system 100 of FIG. 1, in a context of associated system elements, and, as such, describes electronics and software executing operations as described in reference to FIGS. 2-6. FIG. 7 depicts a non-limiting example of system elements, features and configurations; many other features and configurations are contemplated. In the example shown in FIG. 7, the client computing device 130 of FIG. 1 includes a computer system 710, multiple components 720 for interacting with the biological surface 180, a computer-readable medium 730, and a client application 740, that can be stored as computer-executable instructions on the computer-readable medium 730, and, when executed by the computer system 710, can implement the operations described in reference to the system 100 of FIG. 1, and the operations of the example techniques of FIGS. 2-3.

The client computing device 130 incorporates subcomponents including, but not limited to, a power source 711, a human-machine interface 713, one or more processors 715, a network interface 717, and can include the computer-readable medium 730. The power source 711 is a direct-current power source, for example, a rechargeable battery or a rectified power supply configured to connect to line-power (e.g., 110 VAC, 220 VAC, etc.). The human-machine interface (HMI) 713 can include any type of device capable of receiving user input or generating output for presentation to a user, such as a speaker for audio output, a microphone for receiving audio commands, a push-button switch, a toggle switch, a capacitive switch, a rotary switch, a slide switch, a rocker switch, or a touch screen.

The one or more processors 715 are configured to execute computer-executable instructions stored on the computer-readable medium 730. In an embodiment, the processor(s) 715 are configured to receive and transmit signals to and/or from the components 720 via a communication bus or other circuitry, for example, as part of executing the client application 740. The network interface 717 is configured to transmit and receive signals to and from the client computing device 130 (or other computing devices) on behalf of the processors 715. The network interface 717 can implement any suitable communication technology, including but not limited to short-range wireless technologies such as Bluetooth, infrared, near-field communication, and Wi-Fi; long-range wireless technologies such as WiMAX, 2G, 3G, 4G, LTE, and 10G; and wired technologies such as USB, FireWire, Thunderbolt, and/or Ethernet. The computer-readable medium 730 is any type of computer-readable medium on which computer-executable instructions can be stored, including but not limited to a flash memory (SSD), a ROM, an EPROM, an EEPROM, and an FPGA. The computer-readable medium 730 and the processor(s) 715 can be combined into a single device, such as an ASIC, or the computer-readable medium 730 can include a cache memory, a register, or another component of the processor 715.

In the illustrated embodiment, the computer-readable medium 730 stores computer-executable instructions that, in response to execution by one or more processors 715, cause the client computing device 130 to implement a control engine 731. The control engine 731 controls one or more aspects of the client computing device 130, as described above. In some embodiments, the computer-executable instructions are configured to cause the client computing device 130 to perform one or more operations such as generating a surface mapping of the target surface, generating a trace, or outputting the trace to server(s) 160. In some embodiments, the control engine 731 controls basic functions by facilitating interaction between the computer system 710 and the components 720 according to the client application 740. In some embodiments, the control engine 731 detects input from HMI 713 indicating that a cosmetic routine is to be initiated (e.g., in response to activation of a power switch or "start" button, or detection of a face in front of the camera 140 of FIG. 1), or receives signals from client computing device(s) 130, the remote computer system 160, or user device(s) 190 (e.g., over a Bluetooth paired connection).

The components of the client computing device 130 can be adapted to the application or can be specific to the application (e.g., ASICs). For example, the components 720 can include one or more cameras 721, a display 723, one or more radiation sources 725, and/or one or more radiation sensors 727, as described in more detail in reference to FIG. 1. In some embodiments, the components 720 are integrated into a single device. In this way, the client computing device 130 can be a specialized computing device, configured to execute the client application 740 in coordination with the components 720. In some embodiments, the client computing device 130 is a general purpose mobile electronic device, such as a tablet or smartphone, storing the client application 740.

In some embodiments, the client application 740 also includes an image capture/3D scanning engine 741 configured to capture and process digital images (e.g., color images, infrared images, depth images, etc.) obtained from one or more of the components 720 including but not limited to stereoscopic images, LiDAR data, or other forms of surface/depth sensing information. In some embodiments, such data are used to obtain a clean and precise 3D contour mapping of the target body surface (e.g., target surface 181 of FIG. 1). In some embodiments, the digital images or scans are processed by the client computing device 130 and/or transmitted to the remote computer system 160 for processing in a 3D model engine 781. In an embodiment, captured image data is used in position tracking engine 743 for determining the position of features, key-points, or edges on the target body surface. In some embodiments, the position tracking engine 743 tracks the contours of the target body surface in a 3D space, for example, by implementing v-SLAM techniques. In some embodiments, position information from the position tracking engine 743 is used to generate signals to be transmitted to the control engine 731, which are used to control one or more components 720 or elements of the computer system 710 including, for example, the sources 725 or the HMI 713, according to techniques described herein.

In some embodiments, digital 3D models described herein are generated based on sensor data obtained the client computing device 130. As such, the digital 3D models are generated by the client computing device 130 or some other computing device, such as a cloud computing system, or a combination thereof. In some embodiments, the digital 3D models include 3D topology and texture information, which can be used for reproducing an accurate representation of a body surface, such as facial structure and skin features, as described in more detail in reference to FIGS. 1-6.

In some embodiments, the client application 740 includes a user interface 745. In an embodiment, the user interface 745 includes interactive functionality including but not limited to graphical guides or prompts, presented via the display to assist a user in selecting cosmetic designs, tutorial videos, or animations. In some embodiments, the user interface 745 provides guidance (e.g., visual guides such as arrows or targets, progress indicators, audio/haptic feedback, synthesized speech, etc.) to guide a user under particular lighting conditions, angles, etc., in order to ensure that sufficient data is collected for use by mapping and projection engines.

The client application 740 can include a mapping module 747. The mapping module 747 can be or include computer-readable instructions (e.g., software, drivers, etc.) for translating a numerical representation of a cosmetic design into an augmented reality cosmetic design filter. As part of the operation of the mapping module 747, the client application 740 can receive real-time data from the camera(s) 721 and sensors 727, which can be processed by the 3D scanning engine 741, the position tracking engine 743, and can be used to progressively update the mapping and the cosmetic design as it is developed during a sequence of applications to the target body surface. In this way, the mapping module 747 can respond to motion of the target body surface, thereby increasing the tolerance of the client computing device 130 for motion on the part of the user without loss of fidelity to the cosmetic design filter. In some embodiments, the computational resource demand for such real time scanning/tracking, can be spread across multiple devices, such as the remote computer system 160, through parallelization or distribution routines.

A communication module 749 of the client application 740 can be used to prepare information for transmission to, or to receive and interpret information from other devices or systems, such as the remote computer system 160 or the user device(s) 190, As described in more detail in reference to FIG. 1. Such information can include captured digital images, scans, or video, personal care device settings, custom care routines, user preferences, user identifiers, device identifiers, or the like. In an embodiment, the client computing device 130 collects data describing execution of care routines, image data of body surfaces, or other data. In an embodiment, such data is transmitted via the network interface 717 to the remote computer system 160 for further processing or storage (e.g., in a product data store 783 or user profile data store 785). The client computing device 130 can be used by a consumer, personal care professional, or some other entity to interact with other components of the system 700, such as the remote computer system 160 or user device(s) 190. In an embodiment, the client computing device 130 is a mobile computing device such as a smartphone or a tablet computing device equipped with the components 720 and the client application 740 or provided with the components through electronic coupling with a peripheral device.

Illustrative components and functionality of the remote computer system 160 will now be described. The remote computer system 160 includes one or more server computers that implement one or more of the illustrated components, e.g., in a cloud computing arrangement. The remote computer system 160 includes a projection engine 787, the 3D model engine 781, the product data store 783, and the user profile data store 785. In an embodiment, the 3D model engine 781 uses image data (e.g., color image data, infrared image data) and depth data to generate a 3D model of the target body surface. The image data is obtained from the client computing device 130, for example, from the camera(s) 721 or the sensor(s) 727 that are integrated with or otherwise electronically coupled with client computing device 130. In an embodiment, image data and depth data associated with a user is stored in the user profile data store 785. In an embodiment, user consent is obtained prior to storing any information that is private to a user or can be used to identify a user.

In an embodiment, the mapping/projection engine 787 performs processing of data relating to a cosmetic routine, such as generating mappings of target surfaces using image/sensor data and/or generating a projection of the cosmetic routine as an augmented reality filter, which can then be transmitted to the user device(s) 190. In some embodiments, the projection engine 787 generates cosmetic design data using user information from the user profile data store 785, the product data store 783, the 3D model engine 781, or some other source or combination of sources.

The 3D model engine 781 can employ machine learning or artificial intelligence techniques (e.g., template matching, feature extraction and matching, classification, artificial neural networks, deep learning architectures, genetic algorithms, or the like). For example, to generate the cosmetic design in accordance with a surface mapping of a face, the 3D model engine 781 can analyze a facial mapping generated by the 3D model engine 781 to measure or map contours, wrinkles, skin texture, etc., of the target body surface. The 3D model engine 781 can receive data describing a cosmetic design based on an identifier code provided by the user through the user device(s) 190. In such a scenario, the 3D model engine 781 can use such information to generate a projection of the cosmetic design (e.g., cosmetic design 110 of FIG. 1) onto an image of the corresponding body surface of a user the augmented reality cosmetic design filter.

The devices shown in FIG. 7 can communicate with each other via the network 170, which can include any suitable communication technology including but not limited to wired technologies such as DSL, Ethernet, fiber optic, USB, Firewire, Thunderbolt; wireless technologies such as WiFi, WiMAX, 3G, 4G, LTE, 5G, 10G, and Bluetooth; and private networks (e.g., an intranet) or public networks (e.g., the Internet). In general, communication between computing devices or components of FIG. 7, or other components or computing devices used in accordance with described embodiments, occur directly or through intermediate components or devices.

Alternatives to the arrangements disclosed and described with reference to FIGS. 1 and 7, are possible. For example, functionality described as being implemented in multiple components can instead be consolidated into a single component, or functionality described as being implemented in a single component can be implemented in multiple illustrated components, or in other components that are not shown in FIG. 1 or 7. As another example, devices in FIGS. 1 and 7 that are illustrated as including particular components can instead include more components, fewer components, or different components without departing from the scope of described embodiments. As another example, functionality that is described as being performed by a particular device or subcomponent can instead be performed by one or more other devices within a system. As an example, the 3D model engine 714 can be implemented in client computing device 130 or in some other device or combination of devices.

In addition to the technical benefits of described embodiments that are described elsewhere herein, numerous other technical benefits are achieved in some embodiments. For example, the system 700 allows some aspects of the process to be conducted independently by personal care devices or client computing devices, while moving other processing burdens to the remote computer system 160 (which can be a relatively high-powered and reliable computing system), thus improving performance and preserving battery life for functionality provided by personal care devices or client computing devices.

In general, the word "engine," as used herein, refers to logic embodied in hardware or software instructions written in a programming language, such as C, C++, COBOL, JAVA™, PHP, Perl, HTML, CSS, JavaScript, VBScript, ASPX, Microsoft .NET™, and/or the like. An engine can be compiled into executable programs or written in interpreted programming languages. Software engines can be callable from other engines or from themselves. Generally, the engines described herein refer to logical modules that can be merged with other engines or divided into sub-engines. The engines can be stored in any type of computer-readable medium or computer storage device and be stored on and executed by one or more general purpose computers, thus creating a special purpose computer configured to provide the engine or the functionality thereof.

As understood by one of ordinary skill in the art, a "data store" as described herein can be any suitable device configured to store data for access by a computing device. One example of a data store is a highly reliable, high-speed relational database management system (DBMS) executing on one or more computing devices and accessible over a high-speed network. Another example of a data store is a key-value store. However, any other suitable storage technique and/or device capable of quickly and reliably providing the stored data in response to queries can be used, and the computing device can be accessible locally instead of over a network, or can be provided as a cloud-based service. A data store can also include data stored in an organized manner on a computer-readable storage medium, as described further below. One of ordinary skill in the art will recognize that separate data stores described herein can be combined into a single data store, and/or a single data store described herein can be separated into multiple data stores, without departing from the scope of the present disclosure.

Figure 8:
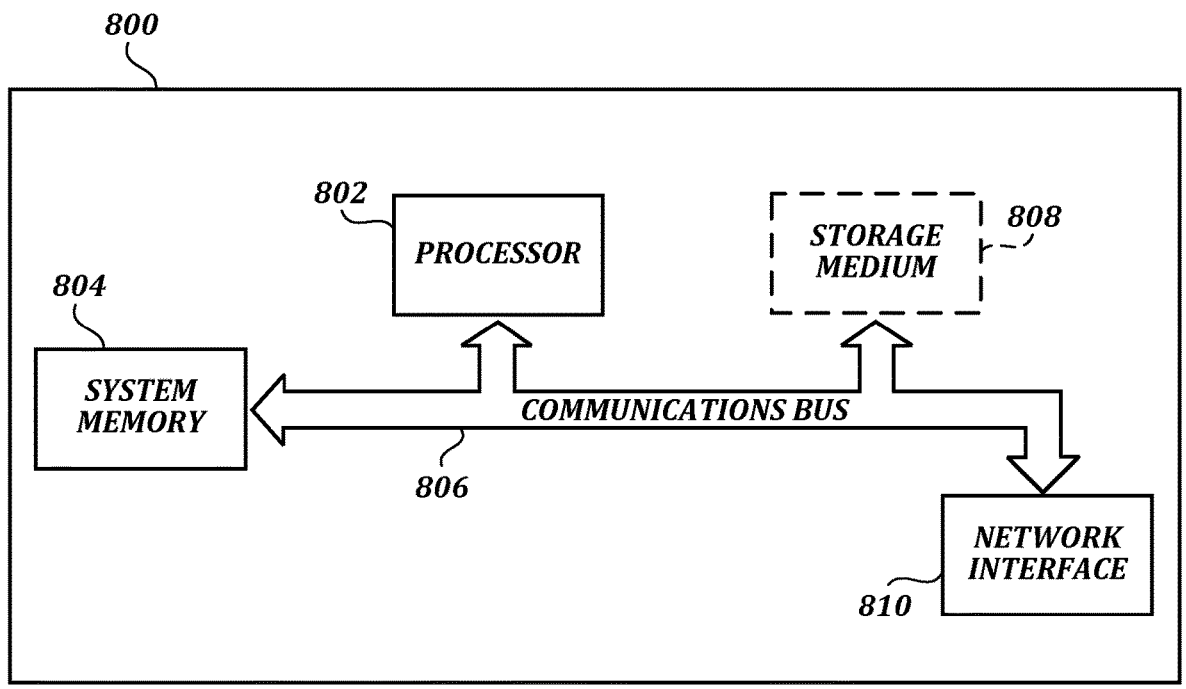
FIG. 8 is a block diagram that illustrates aspects of an example computing device, in accordance with various embodiments.

FIG. 8 is a block diagram that illustrates aspects of an example computing device 800, in accordance with various embodiments. While multiple different types of computing devices are described in reference to the various embodiments, the example computing device 800 describes various elements that are common to many different types of computing devices. While FIG. 8 is described with reference to a computing device that is implemented as a device on a network, the description below is applicable to servers, personal computers, mobile phones, smart phones, tablet computers, embedded computing devices, and other devices that can be used to implement portions of embodiments of the present disclosure. Moreover, those of ordinary skill in the art and others will recognize that the computing device 800 can be any one of any number of currently available or yet to be developed devices.

In its most basic configuration, the example computing device 800 includes at least one processor 802 and a system memory 804 connected by a communication bus 806. Depending on the exact configuration and type of device, the system memory 804 can be volatile or nonvolatile memory, such as read only memory ("ROM"), random access memory ("RAM"), EEPROM, flash memory, or similar memory technology. Those of ordinary skill in the art and others will recognize that system memory 804 typically stores data and/or program modules that are immediately accessible to and/or currently being operated on by the processor 802. In this regard, the processor 802 can serve as a computational center of the computing device 800 by supporting the execution of instructions.

As further illustrated in FIG. 8, the computing device 800 can include a network interface 810 comprising one or more components for communicating with other devices over a network. Embodiments of the present disclosure can access basic services that utilize the network interface 810 to perform communications using common network protocols. The network interface 810 can also include a wireless network interface configured to communicate via one or more wireless communication protocols, such as WiFi, 2G, 3G, LTE, WiMAX, Bluetooth, Bluetooth low energy, and/or the like. As will be appreciated by one of ordinary skill in the art, the network interface 810 illustrated in FIG. 8 can represent one or more wireless interfaces or physical communication interfaces described and illustrated above with respect to particular components of the system 100 of FIG. 1.

In the exemplary embodiment depicted in FIG. 8, the computing device 800 also includes a storage medium 808. However, services can be accessed using a computing device that does not include means for persisting data to a local storage medium. Therefore, the storage medium 808 depicted in FIG. 8 is represented with a dashed line to indicate that the storage medium 808 is optional. In any event, the storage medium 808 can be volatile or nonvolatile, removable or nonremovable, implemented using any technology capable of storing information including, but not limited to, a hard disk drive, solid state drive, CD ROM, DVD, or other disk storage, magnetic cassettes, magnetic tape, magnetic disk storage, and/or the like.

As used herein, the term "computer-readable medium" includes volatile and non-volatile and removable and non-removable media implemented in any method or technology capable of storing information, such as computer readable instructions, data structures, program modules, or other data. In this regard, the system memory 804 and storage medium 808 depicted in FIG. 8 are merely examples of computer-readable media.

Suitable implementations of computing devices that include a processor 802, system memory 804, communication bus 806, storage medium 808, and network interface 810 are known and commercially available. For ease of illustration and because it is not important for an understanding of the claimed subject matter, FIG. 8 does not show some of the typical components of many computing devices. In this regard, the example computing device 800 can include input devices, such as a keyboard, keypad, mouse, microphone, touch input device, touch screen, and/or the like. Such input devices can be coupled to the example computing device 800 by wired or wireless connections including RF, infrared, serial, parallel, Bluetooth, Bluetooth low energy, USB, or other suitable connections protocols using wireless or physical connections. Similarly, the example computing device 800 can also include output devices such as a display, speakers, printer, etc. Since these devices are well known in the art, they are not illustrated or described further herein.

While illustrative embodiments have been illustrated and described, it will be appreciated that various changes can be made therein without departing from the spirit and scope of the invention. It is to be understood that the methods and systems described herein are not limited to specific methods, specific components, or to particular implementations. It is also to be understood that the terminology used herein is for the purpose of describing embodiments only and is not intended to be limiting.

As used in the specification and the appended claims, the singular forms "a," "an" and "the" include plural referents unless the context clearly dictates otherwise. Ranges can be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance can or can not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

The embodiments of the invention in which an exclusive property or privilege is claimed are defined as follows:

1. One or more non-transitory computer memory devices storing computer-readable instructions that, when executed by computing circuitry, cause the computing circuitry to perform operations for generating an augmented reality cosmetic design filter, the operations comprising:
    defining a baseline description of a biological surface using one or more radiation sensors, the radiation sensors being electronically coupled with the computing circuitry;
    identifying an application of a cosmetic formulation to the biological surface using the one or more radiation sensors;
    generating one or more traces describing the application in reference to the baseline description; and
    outputting the one or more traces, wherein the one or more traces includes at least a layering sequence of the cosmetic formulation application, wherein the one or more traces include transparency information that describe localized transparency of coloration of the application.

2. The one or more non-transitory computer memory devices of claim 1, wherein identifying the application of the cosmetic formulation comprises detecting the cosmetic formulation relative to the biological surface using the one or more of the radiation sensors and the baseline description.

3. The one or more non-transitory computer memory devices of claim 1, wherein generating the one or more traces comprises:
    receiving information describing a plurality of shape types;
    attributing a first shape type of the shape types to at least a portion of the biological surface using the baseline description;
    generating digital data of the application of the cosmetic formulation, the digital data describing position information relative to the baseline description; and
    transforming the digital data from the first shape type to a second shape type of the shape types.

4. The one or more non-transitory computer memory devices of claim 3, wherein the biological surface is a face, and wherein the first shape type and the second shape type describe a facial feature.

5. The one or more non-transitory computer memory devices of claim 1, wherein defining the baseline description of the biological surface comprises projecting invisible electromagnetic radiation onto the biological surface using a radiation source electronically coupled with the computing circuitry.

6. The one or more non-transitory computer memory devices of claim 1, wherein the one or more radiation sensors comprise a camera configured to detect electromagnetic radiation from ultraviolet, visible, or infrared spectral ranges, or a combination thereof.

7. The one or more non-transitory computer memory devices of claim 1, wherein generating the one or more traces comprises:
    tracking a motion of the application relative to the biological surface; and
    generating digital data of the motion relative to the baseline description.

8. The one or more non-transitory computer memory devices of claim 1, wherein the instructions, when executed by the computing circuitry, cause the computing circuitry to perform further operations comprising:
    identifying the cosmetic formulation; and
    defining a color of the cosmetic formulation using identifier information of the cosmetic formulation.

9. The one or more non-transitory computer memory devices of claim 1, wherein the instructions, when executed by the computing circuitry, cause the computing circuitry to perform further operations comprising:
    estimating a surface tone of the biological surface;
    estimating a formulation tone of the cosmetic formulation; and
    determining a color of the cosmetic formulation using the surface tone and the formulation tone.

10. The one or more non-transitory computer memory devices of claim 1, wherein the one or more non-transitory computer memory devices are electronically coupled with a smart phone.

11. The one or more non-transitory computer memory devices of claim 1, wherein outputting the one or more traces comprises:
    communicating the one or more traces to a remote computing system.

12. A method for generating an augmented reality cosmetic design filter, comprising:
    defining a baseline description of a biological surface using one or more radiation sources and one or more radiation sensors;
    identifying an application of a cosmetic formulation to the biological surface using the radiation sensors;
    generating one or more traces describing the application in reference to the baseline description; and
    outputting the one or more traces, wherein the one or more traces includes at least a layering sequence of the cosmetic formulation application, wherein the one or more traces include transparency information that describe localized transparency of coloration of the application.

13. The method of claim 12, wherein generating the one or more traces comprises:
    receiving shape information describing a plurality of shape types;
    attributing a first shape type of the shape types to at least a portion of the biological surface using the shape information;
    generating digital data of the application of the cosmetic formulation, the digital data describing position information relative to the baseline description; and
    transforming the digital data from the first shape type to a second shape type of the shape types.

14. The method of claim 12, wherein identifying the application of the cosmetic formulation comprises:
    detecting an applicator of the cosmetic formulation;
    estimating a position of the applicator of the cosmetic formulation relative to the biological surface;
    tracking a motion of the applicator relative to the biological surface; and
    generating digital data of the motion relative to the baseline description.

15. The method of claim 12, further comprising:
    estimating a surface tone of the biological surface;
    estimating a formulation tone of the cosmetic formulation; and
    determining a color of the cosmetic formulation using the surface tone and the formulation tone.

* * * * *